(12) United States Patent
Duan et al.

(10) Patent No.: US 10,346,893 B1
(45) Date of Patent: Jul. 9, 2019

(54) VIRTUAL DRESSING ROOM

(71) Applicant: A9.com, Inc., Palo Alto, CA (US)

(72) Inventors: Lixin Duan, Seattle, WA (US); Rahul Bhotika, Redmond, WA (US); Song Cao, Seattle, WA (US)

(73) Assignee: A9.com, Inc., Palo Alto, CA (US)

( * ) Notice: Subject to any disclaimer, the term of this patent is extended or adjusted under 35 U.S.C. 154(b) by 625 days.

(21) Appl. No.: 15/076,332

(22) Filed: Mar. 21, 2016

(51) Int. Cl.
| | | |
|---|---|---|
| *G06Q 30/00* | (2012.01) | |
| *G06Q 30/06* | (2012.01) | |
| *G06N 20/00* | (2019.01) | |
| *G06F 16/28* | (2019.01) | |
| *G06F 16/9535* | (2019.01) | |
| *G06F 16/2457* | (2019.01) | |

(52) U.S. Cl.
CPC ... *G06Q 30/0627* (2013.01); *G06F 16/24578* (2019.01); *G06F 16/287* (2019.01); *G06F 16/9535* (2019.01); *G06N 20/00* (2019.01); *G06Q 30/0643* (2013.01)

(58) Field of Classification Search
CPC .......................................... G06Q 30/06–30/08
USPC ................................................ 705/26.1–27.2
See application file for complete search history.

(56) References Cited

U.S. PATENT DOCUMENTS

| | | | | |
|---|---|---|---|---|
| 6,968,075 B1* | 11/2005 | Chang | ............... | G06K 9/00214 382/111 |
| 2015/0254555 A1* | 9/2015 | Williams, Jr. | ....... | G06N 3/0454 706/14 |
| 2017/0148089 A1* | 5/2017 | Murzin | .............. | G06Q 30/0643 |

* cited by examiner

*Primary Examiner* — Ethan D Civan

(74) *Attorney, Agent, or Firm* — Hogan Lovells US LLP

(57) ABSTRACT

Machine learning-based approaches are used to identify complementary sets of items, such as articles of clothing and accessories that "match," and suggest items that would complement a given item of interest. A simulated representation of how the item of interest and the identified complementary items would look together is then generated. For example, given a particular piece of clothing or other apparel item of interest, additional items that complement the item of interest can be identified and suggested to a potential purchaser of the item. Additionally, a three-dimensional (3D) or pseudo-3D representation of a human body can be generated to model the apparel item of interest and the identified complementary apparel items to give the user an idea of how the suggested outfit would look on a user. The representation can be modified to more closely resemble a particular user.

20 Claims, 13 Drawing Sheets

VIRTUAL DRESSING ROOM

BACKGROUND

Consumers are increasingly utilizing electronic marketplaces to purchase clothing and other apparel items, including accessories such as bags and shoes. Consumers who have purchased items like clothing from electronic marketplaces sometimes struggle to identify other complementary items to wear with their purchases. For example, a consumer who has identified a shirt that the consumer would like to purchase from an electronic marketplace may wish to purchase pants that would match the shirt. Because the consumer has identified the shirt on an electronic marketplace, though, the consumer is unable to try the shirt on before purchasing it so as to be able to find a matching pair of pants.

BRIEF DESCRIPTION OF THE DRAWINGS

Various embodiments in accordance with the present disclosure will be described with reference to the drawings, in which.

DETAILED DESCRIPTION

Figure 1A:
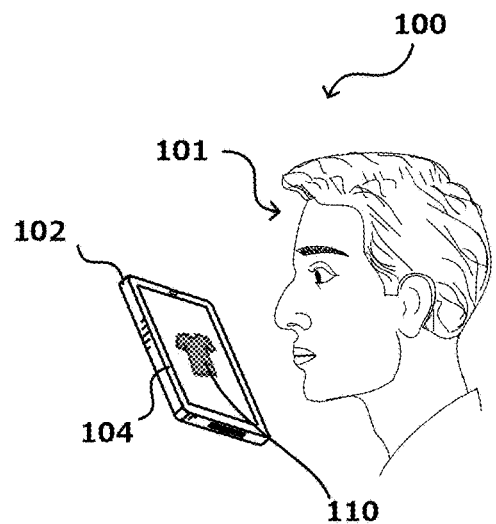
FIGS. 1A-D illustrate an example process in which a user purchases an article of clothing and attempts to identify another complementary article of clothing in accordance with various embodiments.

Systems and methods in accordance with various embodiments of the present disclosure may overcome one or more of the aforementioned and other deficiencies experienced in conventional approaches for identifying complementary items. In particular, various embodiments utilize a machine learning-based approach to identify matching sets of items, such as articles of clothing and accessories. For example, in accordance with various embodiments, an image is obtained that includes a representation of an item of interest, such as an article of clothing. The image of the item of interest can be obtained from a user searching an electronic marketplace or other electronic store, for example, by submitting a search query that describes an item the user is looking for. After the user reviews the results of the search, the user can select an item that the user would like to purchase. The electronic marketplace then can show the user an image of the item. As an alternative to entering a search query that describes the item, a user can see an item in which the user is interested in a brick-and-mortar store or otherwise see the item in person; the user can take a photo of the item and use the photo to search an electronic marketplace for the item or a similar item using object recognition or categorization features of the electronic marketplace. Additionally, the user can upload an existing image of an item of interest to the electronic marketplace to search for the item or a similar item. Then, when the user is interested in purchasing an item, other items that complement the item of interest can be identified and suggested. For example, if the user is interested in a shirt, pants and shoes that match the shirt can be identified and suggested to the user. Items of interest and complementary items can include apparel items such as articles of clothing and accessories, including, e.g., shirts, pants, shoes, dresses, bags, hats, and sporting equipment, as well as other items that a user might wish to purchase from an electronic marketplace or other electronic store.

Additionally, a three-dimensional (3D) or pseudo-3D (e.g., two-and-a-half-dimensional (2.5D)) representation of a human body can be generated to "model" the shirt, pants, and shoes together. That is, for apparel items, the item of interest can be displayed on the model, and the identified complementary apparel items can be displayed on the model with the item of interest to give the user an idea of what the suggested outfit would look like. Furthermore, embodiments can allow the model to be modified to more closely resemble the user and, consequently, give the user a better idea of what the suggested outfit would look like on the individual user. For example, the modification process can start by selecting one of several 3D or pseudo-3D representations of human bodies that each have different dimensions and shapes (i.e., "template" representations of a body) to serve as a starting point for the modification process. The initial representation (a "starting point" representation) can be selected by determining which template representation has dimensions closest or otherwise most similar to the user's body measurements (e.g., waist, shirt size, inseam, height). The initial representation then can be modified to more closely approximate the user's body measurements. In addition to modifying the model to more closely approximate the shape and dimensions of the user's body, embodiments can include modifying the face of the model to resemble the user's face. Based on images of the user's face (e.g., digital photographs that the user provides, such as panoramic photos of the user's face or a set of several photos of the user's face from different angles) a 3D or pseudo-3D representation of the user's face can be generated. The generated representation of the user's face then can be superimposed on the model's face. Modifying the model to approximate the shape and dimensions of the user's body and to include a 3D or pseudo-3D representation of the user's face advantageously can allow the user to envision what it would look like for the user to try on the suggested outfit. Additionally, use of a 3D or pseudo-3D model can enable the user to rotate the model so as to view the suggested outfit on the model from various angles. Further, embodiments can enable inertial swipes to rotate the model or to enable apparel (e.g., dresses) to be fluttered smoothly with respect to how quickly the user rotates the model.

Various other functions and advantages are described and suggested below as may be provided in accordance with the various embodiments.

Accordingly, approaches in accordance with various embodiments improve the operation and performance of the computing device(s) on which they are implemented and with which they communicate wirelessly by, among other advantages, increasing the accuracy of 3D and pseudo-3D visualizations by modifying representations of a user based on the user's features and increasing the efficiency of recommendations using machine learning techniques. Various other applications, processes, and uses are presented below with respect to the various embodiments, each of which improves the operation and performance of the computing device(s) on which they are implemented.

Figure 1B:
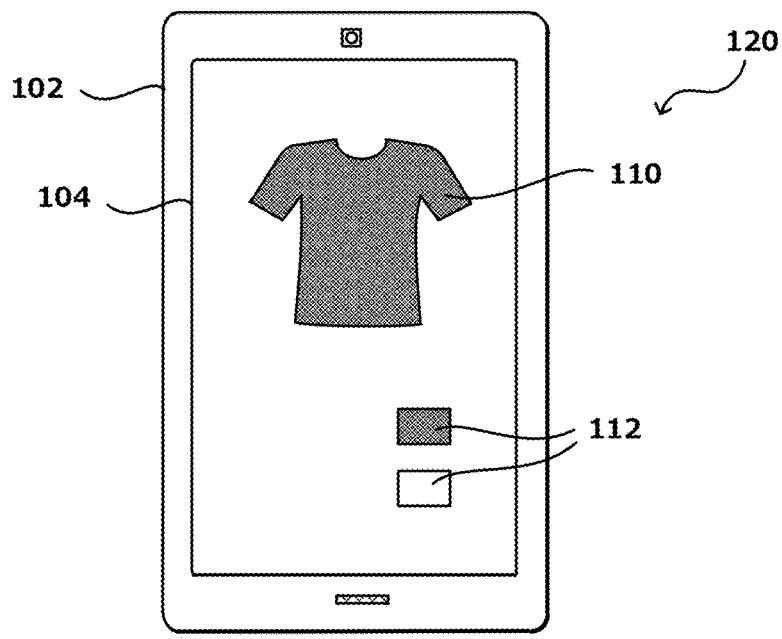
Figure 1C:
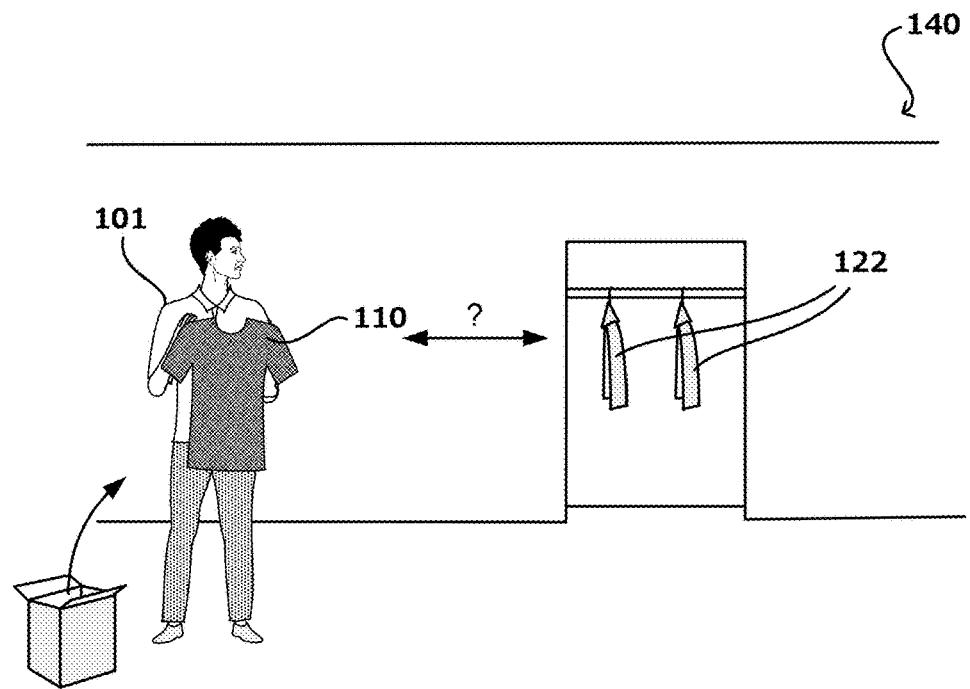
Figure 1D:
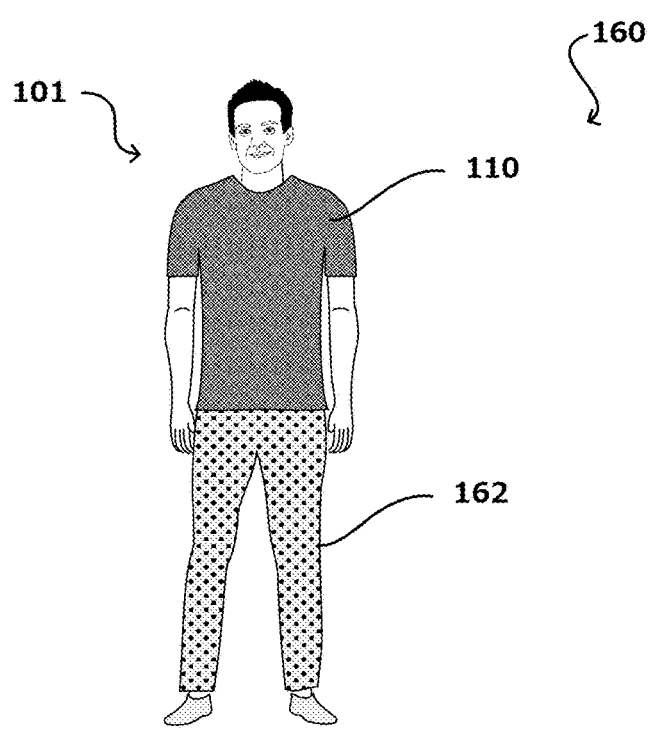

Electronic marketplaces are used increasingly to purchase clothing and other apparel items, including accessories such as bags and shoes. Consumers who have purchased items like clothing from electronic marketplaces sometimes struggle to identify other complementary items to wear with their purchases. For example, a consumer who has identified a shirt that the consumer would like to purchase from an electronic marketplace may wish to purchase pants that would match the shirt. FIG. 1A illustrates an example situation 100 in which a user 101 has located a shirt 110 that the user would like to purchase from an electronic marketplace. The user 101 identifies the shirt 110 using a portable computing device 102 (e.g., a smart phone or tablet computer). As illustrated in situation 120 in FIG. 1B, for example, an application or website associated with the electronic marketplace can display a representation of the shirt 110 and associated purchasing information 112 via a display 104 of the user's portable computing device 102. Because the consumer 101 has identified the shirt on an electronic marketplace, though, the consumer 101 is unable to try the shirt on before purchasing it so as to be able to find a matching pair of pants. In situation 140 as illustrated in FIG. 1C, for example, after purchasing the shirt 110, the user 101 may not be able to find pants 122 that match the shirt 110. As a result, the user 101 may try on the shirt 110 with pants 162 that do not match the shirt 110 in situation 160 as illustrated in FIG. 1D, for example. The user 101 can search the electronic marketplace for pants, but the user 101 may not be able to assess whether the pants the user 101 finds would complement the shirt 110 that the user 101 has selected. As a result, the user 101 can be become frustrated and might not purchase any pants. In fact, the user might not purchase the shirt of interest either. Accordingly, systems and methods in accordance with various embodiments can address these and other concerns by providing an approach that provides a user with items that are likely to be complementary to a particular item of interest, i.e., that "match" the item of interest. Further, various embodiments can enable the user to visualize how the item of interest and the identified complementary items would look if the user were to purchase and use them, such as how the user would look wearing apparel items. Such an approach can improve the likelihood of clicks, purchases, and revenue to the provider of those items, such as an electronic marketplace, and can increase the user's satisfaction with the provider and the shopping experience.

Figure 2A:
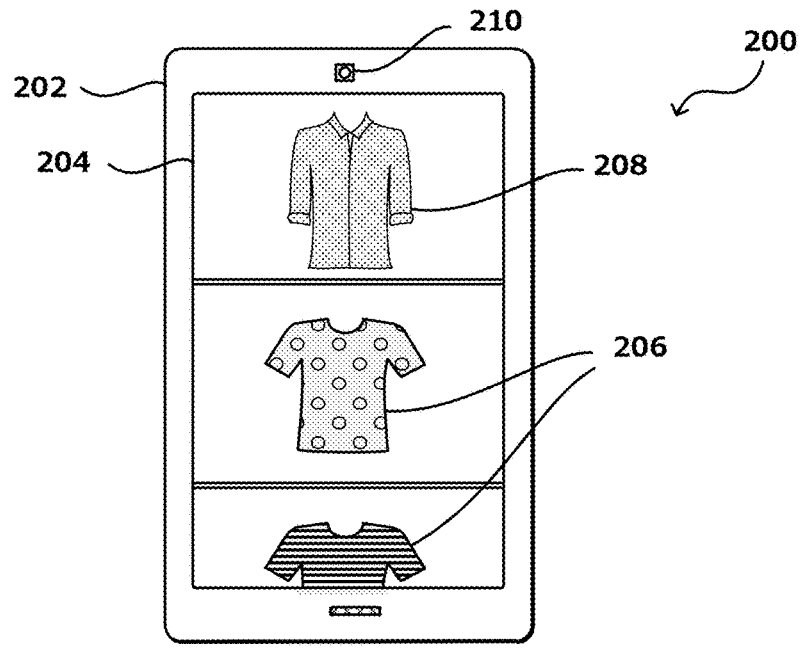
FIGS. 2A-D illustrate an example process for identifying complementary apparel items that can be utilized in accordance with various embodiments.

A user of an electronic marketplace may want to purchase an item and, as described, may be interested in related items that complement the item of interest. Example items include apparel items, such as shirts, blouses, t-shirts, sweaters, pants, shorts, jeans, skirts, pants, shoes, dresses, bags, hats, sporting equipment, jackets, coats, gloves, jewelry, belts, scarves, etc. Various embodiments can include identifying and suggesting items that complement an item the user is interested in purchasing. For example, FIG. 2A illustrates an example situation 200 in which a user is attempting to locate and purchase an item in accordance with various embodiments. In this example, the user is interested in apparel items and is looking at purchasing a shirt. It should be noted that other items can be considered, including other apparel items, and various embodiments described herein can be used to determine items related to the item of interest that complement the item of interest. For example, the user can search an electronic marketplace for an item, such as a shirt, using a portable computing device 202 (e.g., a smart phone or tablet computer). An application or website associated with the electronic marketplace can display representations of the search results 206 via a display 204 of the user's portable computing device 202. The user can select an item, such as shirt 208, from the search results 206.

Figure 2B:
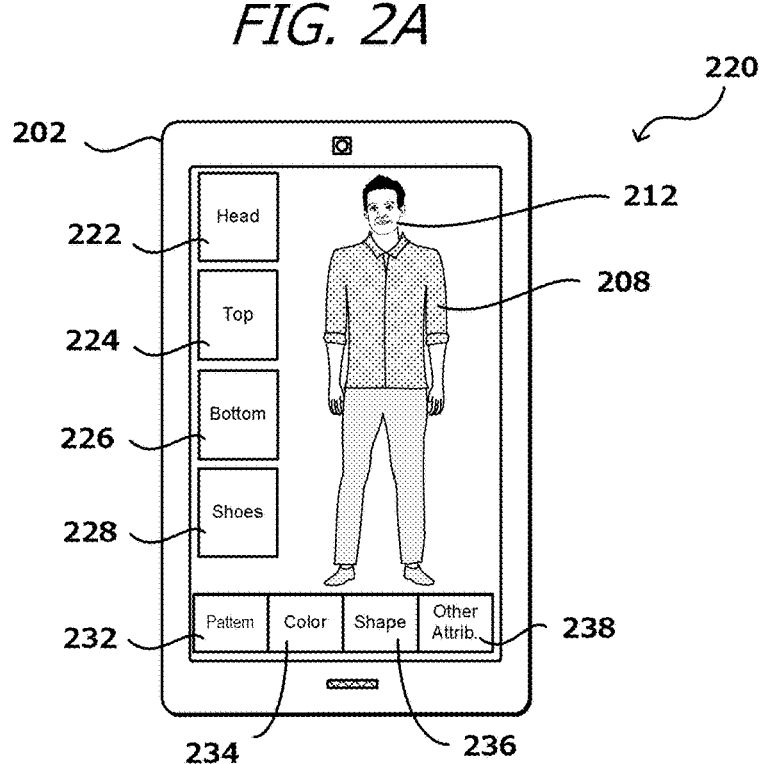
Figure 2C:
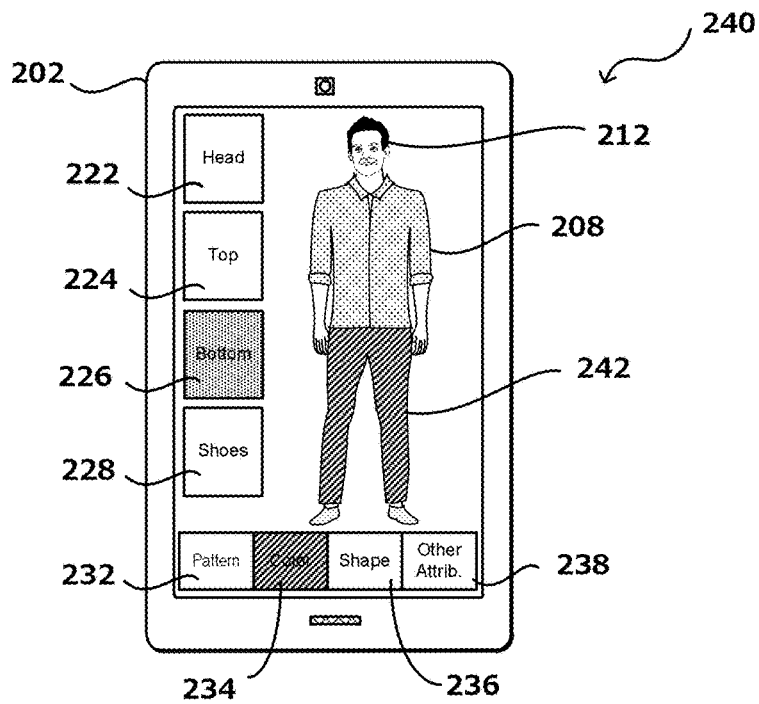
Figure 2D:
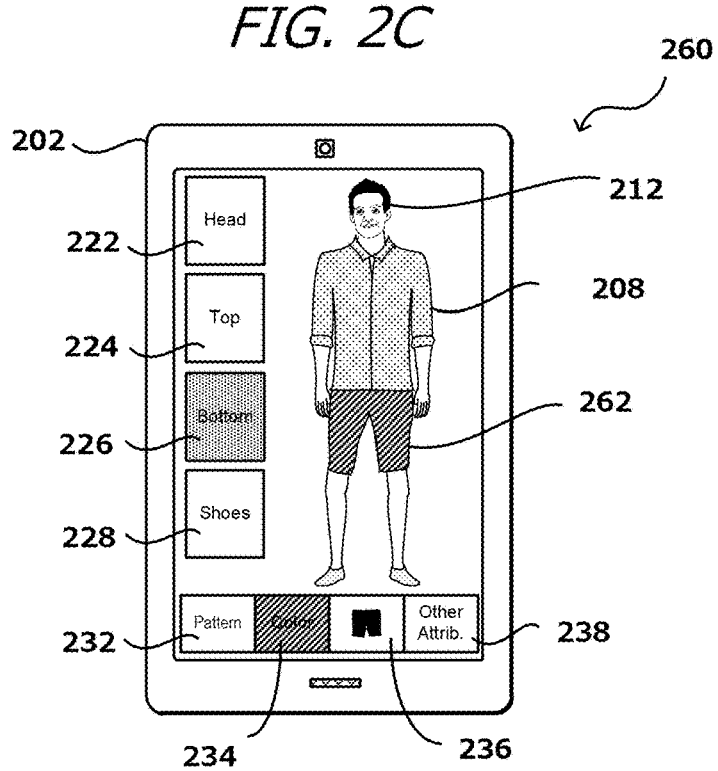

In situation 220, as illustrated in FIG. 2B, the shirt 208 then can be displayed on a representation of a human body, such as model 212. Additionally, in this example, the interface also can include options to select apparel categories (such as head 222, top 224 (e.g., shirt), bottom 226 (e.g., pants), and shoes 228) to suggest other apparel items that complement the shirt 208. For items of interest other than apparel, different categories of suggested related items can be provided. For example, bottom 226 can be selected if the user would like to see recommendations for pants. In situation 240 as illustrated in FIG. 2C, bottom 226 has been selected, which indicates that the user is interested in finding bottoms (e.g., pants) that complement the shirt 208. After bottom 226 is selected, a pair of pants that match the shirt 208 can be identified and suggested to the user. The pants that are identified and suggested can refined by applying certain filters related to attributes of the apparel items, e.g., pattern 232, color 234, shape 236, and other attributes 238. To select an available option for an attribute filter, a user can select from a set of options. For example, to select a particular color to apply the color attribute filter 234, a set of color options can be displayed above the color attribute filter 234 in an overlay, frame, wheel, etc., and the user can toggle between selections of different color options. For example, as illustrated in situation 240, a color attribute filter 234 has been applied, and a pair of pants 242 that are the selected color are identified and displayed on the model 212 with the shirt 208. If other attribute filters are applied, the pants that are identified and displayed on the model 212 can change. For instance, in situation 260 as illustrated in FIG. 2D, the shape attribute filter 236 has been selected, and shorts have been selected. As a result, a pair of shorts 262 are identified and displayed on the model 212 with the shirt 208.

Although a portable computing device 202 (e.g., a smart phone or tablet computer) is shown in FIGS. 2A-D, it should be understood that various other types of electronic devices that are capable of determining and processing input can be used as well in accordance with various embodiments. These devices can include, for example, desktop computers (e.g., equipped with a browser), notebook computers, personal data assistants, e-book readers, cellular phones, video gaming consoles or controllers, smart televisions, set top boxes, a wearable computer (e.g., a smart watch or glasses), and portable media players, among others. In this example, the computing device 202 has at least one camera 210 (or other image capture sensor or element) operable to perform functions such as image and/or video capture, as illustrated in FIG. 2A. Each camera may be, for example, a charge-coupled device (CCD), a motion detection sensor, or an infrared sensor, or can utilize another appropriate image capturing technology. The user can position the device 202 such that various angles of the user's face, for example, are within a field of view of the at least one camera 210 on the computing device 202. In other embodiments, the image can be obtained in any one of a number of different ways, as may include downloading or otherwise obtaining images of the user's face. In at least some embodiments, the image and/or a frame of the video can be analyzed, such as by analyzing on the device or uploading across a network to a service for analyzing image content.

Various embodiments utilize a machine learning-based approach to identify matching sets of items and, in particular, to identify, for a given item, other items that complement it. Examples of machine learning include neural networks, principal component analysis (PCA), support vector machines (SVM), inductive learning, adaptive boosting, and deep learning, among others. For instance, deep learning involves modeling high-level abstractions in data using multiple non-linear transformations. Deep learning techniques are based on the premise that images can be represented in many ways but, from exemplars, certain representations can make it easier to learn tasks of interest, such as matching sets of apparel items represented in images. Deep learning techniques include deep neural networks, convolutional deep neural networks, and deep belief networks. As will be apparent to persons of reasonable skill in the art, any number or combination of machine learning approaches can be applied herein.

As mentioned, machine learning approaches can include neural network-based approaches. Neural networks are inspired by biological neural networks and consist of an interconnected group of functions or classifiers that process information using a connectionist approach. Neural networks change their structure during training, such as by merging overlapping detections within one network and training an arbitration network to combine the results from different networks. Examples of neural network-based approaches include the multilayer neural network, the auto-associative neural network, the probabilistic decision-based neural network (PDBNN), and the sparse network of winnows (SNoW).

As would be understood to one skilled in the art, neural networks consist of multiple layers of neuron collections which look at portions or regions of the input image, called receptive fields. A neuron (or unit) can be a mathematical function. Neurons are the constitutive units in an artificial neural network. The neuron receives one or more inputs such as portions of an image and sums them to produce an output. Usually the sums of each node are weighted, and the sum is passed through a non-linear function known as an activation function or transfer function. The transfer functions usually have a sigmoid shape, but they may also take the form of other non-linear functions, piecewise linear functions, or step functions. They are also often monotonically increasing, continuous, and bounded.

An example neural network is a convolutional neural network (CNN). Convolutional neural networks are a family of statistical learning models used in machine learning applications to estimate or approximate functions that depend on a large number of inputs. The various inputs are interconnected with the connections having numeric weights that can be tuned over time, enabling the networks to be capable of "learning" based on additional information. The adaptive numeric weights can be thought of as connection strengths between various inputs of the network, although the networks can include both adaptive and non-adaptive components. CNNs exploit spatially local correlation by enforcing a local connectivity pattern between nodes of adjacent layers of the network. Different layers of the network can be composed for different purposes, such as convolution and sub-sampling.

Convolutional networks may include local or global pooling layers, which combine the outputs of neuron collections. They also consist of various combinations of convolutional layers and fully connected layers, with point-wise nonlinearity applied at the end of or after each layer. The results of the neuron collections are then tiled so that they overlap to obtain a better representation of the original image and this process is repeated for each layer.

Convolutional layers, for example, have well defined receptive fields. In accordance with various embodiments, these fields can operate on a specific region of the image, while the layers operate on the entire image. The size of the receptive field is a property of the units that make up the layer to which the region is associated with and not a property of the convolutional network. As such, the size of the receptive field is independent of the size of the input image. In this way, if the input image were to grow in size, then the layer would also grow by adding more units of the same type at its edges. Further, as is understood in the art, a notion of location in the original image is retained for convolutional layers throughout the convolutional network. Each particular unit has a receptive field that is defined in shape and size and resides at a specific location in the original image, and if the size of the input is increased, each output can be associated to a specific proposal region.

In each convolutional layer, the convolutional network uses a shared weight, and each layer will compute the output of neurons that are connected to local regions (i.e., receptive fields) in the input, where each neuron computes a dot product between their weights and the region (i.e., receptive field) they are connected to in the input. In this way, each neuron looks at a specific region (i.e., receptive field) of the image and outputs one number: the dot product between its weights and the pixel values of in its region (i.e., receptive field). Fully-connected layers, for example, operate on the entire input and the receptive field size is defined as the entire image. Regions of the image feed into all units of the layer.

There are several types of layers of neurons in a neural network. As mentioned, in a fully connected layer every unit of its input is connected to every unit of the output. This layer is therefore very dense and often contains a very large number of parameters. Effective regularization techniques such as drop-out are used for such layers during the training process. To deal with images, which have very high dimensions, convolutional networks introduce convolutional and pooling layers. A convolution layer differs from a fully connected layer primarily in weight sharing. Weight sharing drives down the number of parameters in a layer significantly, making the network more efficient and helping to avoid over-fitting.

As described, embodiments can include identifying and suggesting other items that complement an item of interest a user is interested in purchasing. Further, machine learning-based approaches can be used to identify matching sets of items and to identify, for a given item, other items that complement it. For example, various embodiments can include training a classifier algorithm on matching scores of sets of items (such as apparel items, e.g., clothes, shoes, bags, jewelry, etc.). The matching scores can indicate the degree of "matchness," that is, the degree to which a set of two or more items "match" (i.e., complement each other). Each of the items can be associated with a category. For apparel items, exemplary categories include tops, bottoms, dresses, shoes, hats, or accessories. Tops, for example, can include shirts, blouses, t-shirts, or sweaters, and bottoms can include pants, shorts, jeans, or skirts, for instance. Further, each set of items that has a matching score can include items from more than one category of items. For example, a set of apparel items that has a matching score can include a blouse, a pair of pants, shoes, and a bag. In some circumstances, the classifier algorithm can be further trained on attributes of items in the sets of items in addition to their categories. These attributes for apparel items, for example, can include pattern, color, silhouette (shape), material, or brand. For instance, for the dresses apparel category, attributes can include color (e.g., red, green, gray, black, bright yellow), sleeve length (e.g., short, medium, long), shape/silhouette (e.g., bodycon, full, high-low), or pattern (e.g., floral, stripes, tie-dye), among others.

Figure 3:
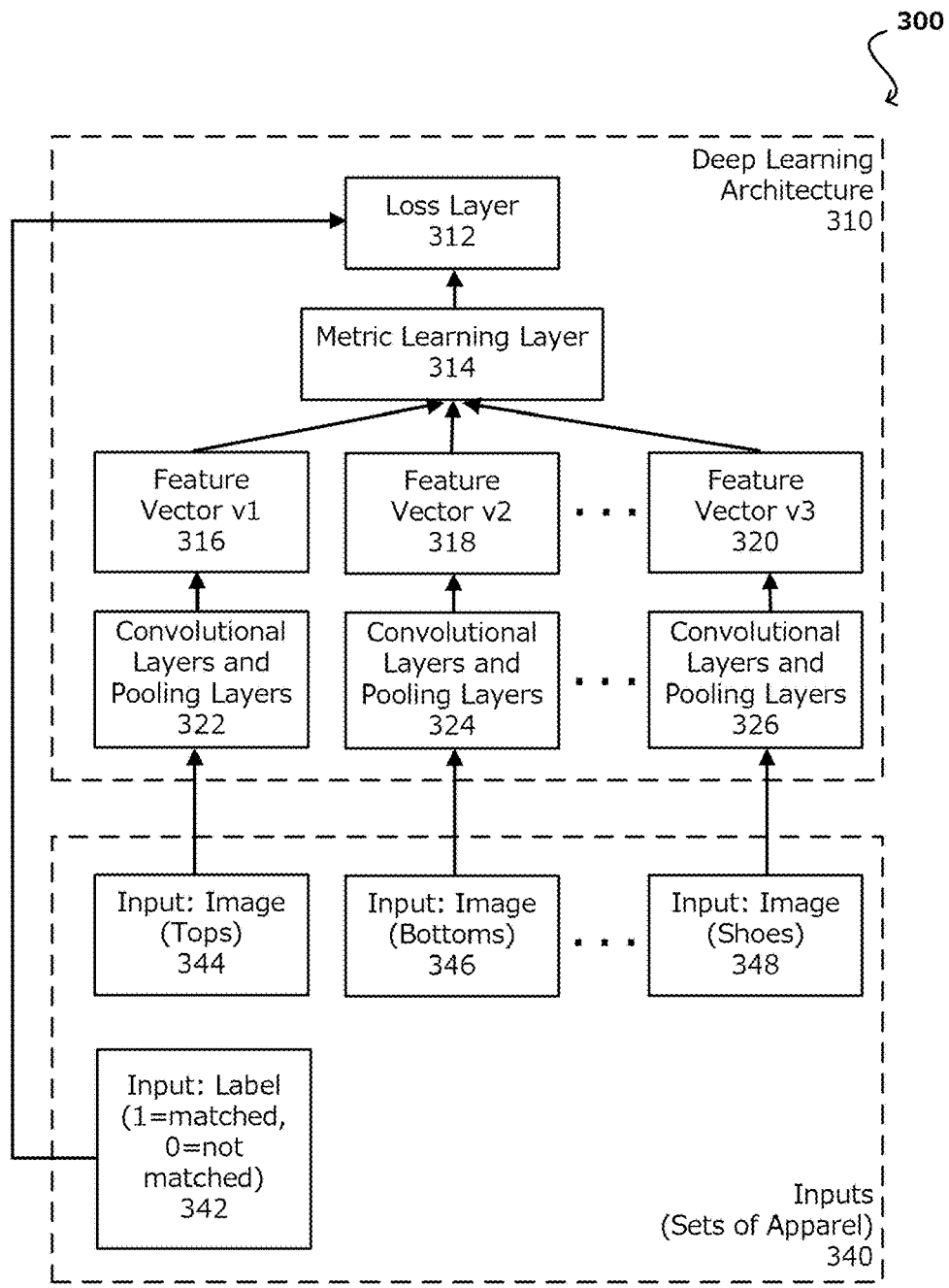
FIG. 3 illustrates an example process for training a classifier algorithm to identify complementary apparel items that can be utilized in accordance with various embodiments.

According to various embodiments, a classifier algorithm used to identify matching sets of items can be a trained deep learning model, for example. An example process 300 for training a classifier algorithm to identify complementary items is illustrated in FIG. 3. In this example, the classifier algorithm is trained to identify matching sets of apparel items. Sets of apparel items can be used as inputs 340 to a deep learning architecture 310. For example, the inputs 340 can include labels 342 and images of various apparel items. Labels 342 can indicate whether a set of items is "matched" (i.e., forms a complementary outfit in this example). If a set of items is matched, the label can be "1," and the label can be "0" to indicate that the set of items is not matched. Images of apparel items can include, for example, images of tops 344, images of bottoms 346, and images of shoes 348, among images of apparel items associated with other apparel categories. Using these inputs 340, the deep learning architecture 310 can train a classifier algorithm. The deep learning architecture 310 can include several layers, such as convolutional and pooling layers 322, 324, and 326 that are each associated with an item category, such as an apparel category; a metric learning layer 314; and a loss layer 312. For example, feature vectors can be generated for each item category for which a set of items is used as an input 340 to the deep learning architecture 340 using convolutional layers and pooling layers. Feature vector $v_1$ for tops 316 can be generated using images of tops 344 as an input to convolutional layers and pooling layers 322, feature vector $v_2$ for bottoms 318 can be generated using images of bottoms 346 as an input to convolutional layers and pooling layers 324, and feature vector $v_3$ for shoes 320 can be generated using images of shoes 348 as an input to convolutional layers and pooling layers 326. Although only three apparel categories (i.e., tops, bottoms, and shoes) are illustrated in FIG. 3, additional and/or different apparel categories also can be used to train the classifier algorithm. Each feature vector associated with an apparel category then can be used as an input to a metric learning layer 314.

With the metric learning layer 314, the architecture 310 can effectively learn the inexplicit information of "matchness" from labeled sets of items 340 and can measure the distance or difference between an input image and any image of a particular item type (e.g., top, bottom, shoe, etc.). In the metric learning layer 314, some metric (a weight matrix) that combines the feature vectors of different items can be learned. The metric learning layer 314 then can feed into a loss layer 312. Labels 342 also can be an input to the loss layer 312. In the loss layer 312, loss can be computed based on the absolute difference between the "matchness" score and the ground-truth label 342 (i.e., the indication of whether a set of apparel items forms a complementary or "matched" outfit). Additionally, the model can be trained to include attributes of items by expanding the sets of items to include attributes as the label information.

Figure 4:
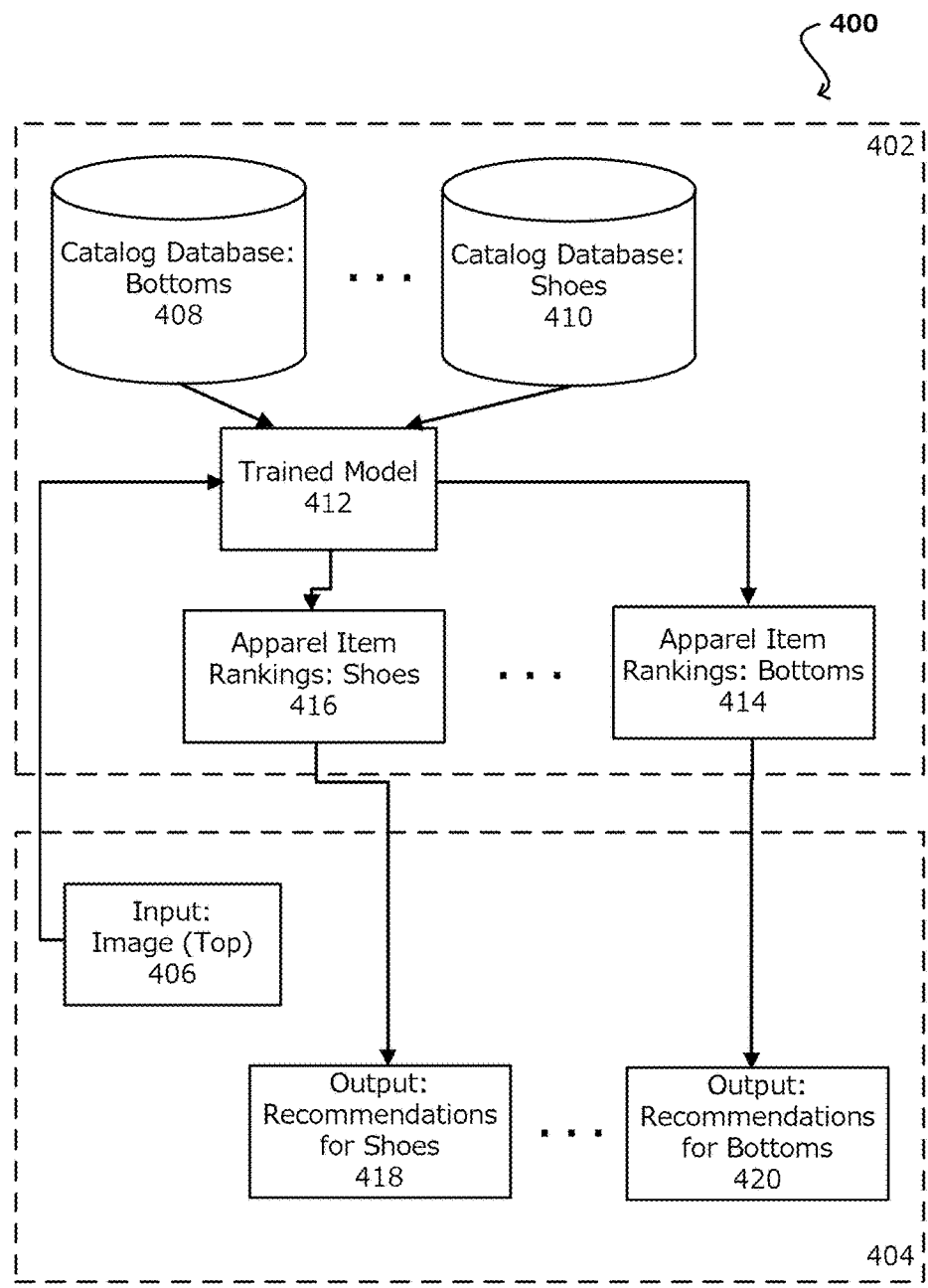
FIG. 4 illustrates an example process for identifying complementary apparel items using a classifier algorithm that can be utilized in accordance with various embodiments.

As described, embodiments can include identifying and suggesting other items that complement an item of interest using a classifier algorithm. After the classifier algorithm has been trained, it can be used to identify matching items. An example process 400 for identifying complementary items using a classifier algorithm, such as a trained model 412, is illustrated in FIG. 4, for example. In the illustrated example, the items are apparel items, and bottoms (e.g., shorts, pants, etc.) and shoes that complement a particular top (e.g., shirts, jackets, tees, etc.) are identified using an image of the top as an input. As a first step, inputs to the trained model 412 include an image of the top 406 as well as information from catalog databases associated with each category of items to be identified and suggested, such as a bottoms catalog database 408 and a shoes catalog database 410 in the example of identifying items that complement a particular top. Information from the catalog databases can be received from a backend service 402, and the image of the top 406 can be received from a user device 404. For example, the image of the top 406 can be obtained from a user searching an electronic marketplace or other electronic store, such as by submitting a search query that describes a top the user is looking for. After the user reviews the results of the search, the user can select a top that the user would like to purchase. The electronic marketplace then can show the user an image of the top 406. As an alternative to entering a search query that describes the top, a user can see a top in which the user is interested in a brick-and-mortar store or otherwise see the top in person; the user can take a photo of the top and use the photo to search an electronic marketplace for the top or a similar top using object recognition or categorization features of the electronic marketplace. Additionally, the user can upload an existing image of a top to the electronic marketplace to search for the top or a similar top. The image of the top 406 additionally can be obtained via social media or through other sources.

Outputs of the trained model 412 at the backend service 402 include rankings for each item category of interest (e.g., for which an apparel item that complements the top is to be identified). For example, illustrated rankings include an item ranking for bottoms 414 and an item ranking for shoes 416. These rankings then can be used to generate outputs on a user device 404, such as recommendations for shoes 418 and recommendations for bottoms 420. Consequently, the trained deep learning model 412 can extract the feature vector of the input (e.g., the image of a top 406) and the feature vectors of the database images of complementary items (e.g., from bottoms catalog database 408 and shoes catalog database 410). The distance or difference between the input image 406 and every database image of each item type (e.g., bottoms and shoes) can be computed through the deep learning model 412. Based on the distance, for each item type, the corresponding database images can be ranked.

Figure 5:
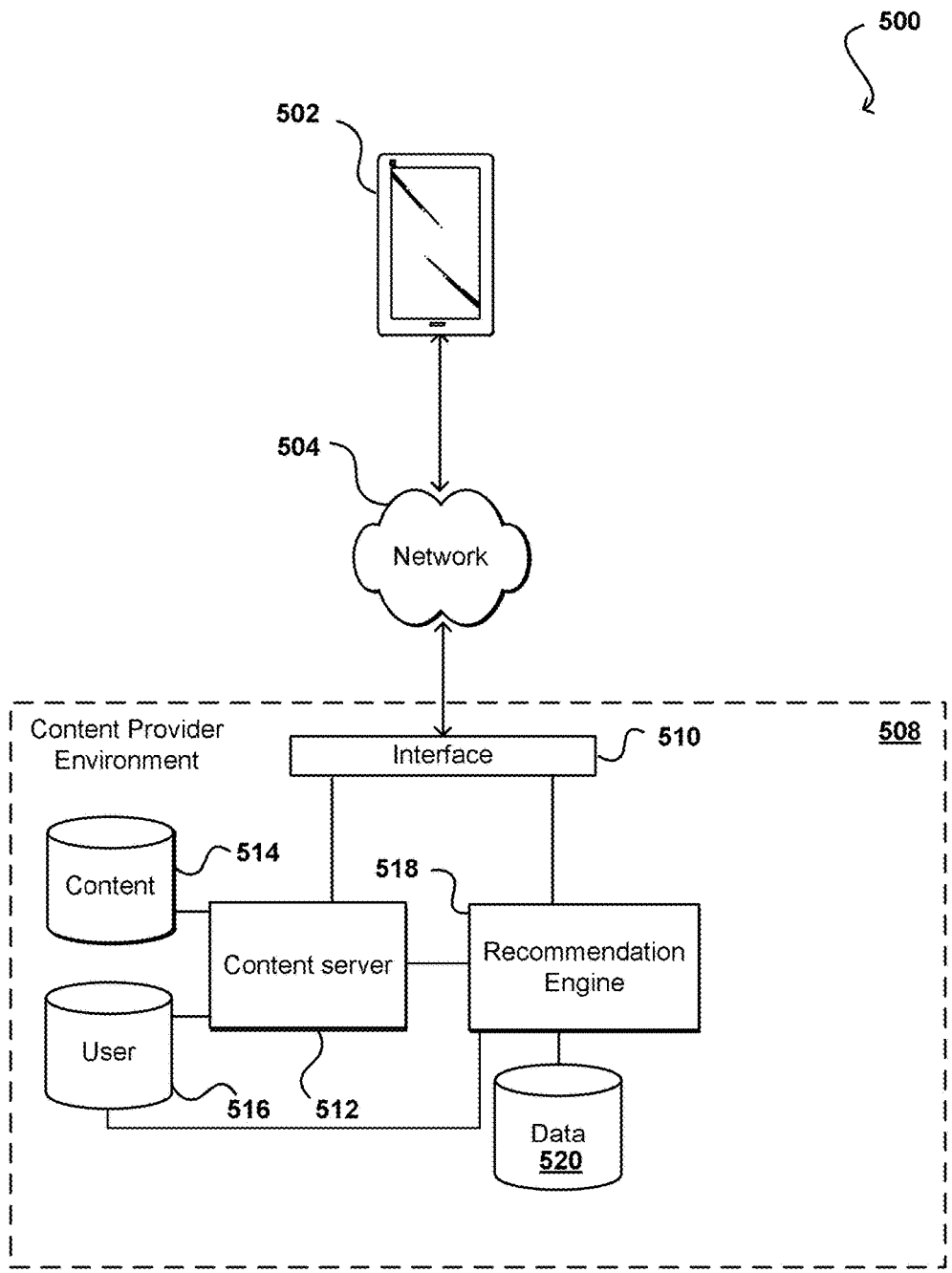
FIG. 5 illustrates an example environment in which aspects of the various embodiments can be implemented.

As described, embodiments can include identifying and suggesting items that complement an item a user is interested in purchasing using machine learning-based approaches, such as a classifier algorithm trained on matching scores of sets of items. Further, embodiments can include providing a simulated representation of how the item of interest and the identified complementary items would look together. FIG. 5 illustrates an example environment 500 in which various embodiments can be implemented. In this example, a user is able to use a client device 502, such as a portable computing device, to submit a request for content, such as a webpage or page of an electronic book, across at least one network 504. Although a portable computing device (e.g., an electronic book reader, smart phone, or tablet computer) is shown as the client device 502, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, wearable computers (i.e., smart watches and glasses), and portable media players, among others. The at least one network 504 can include any appropriate network, such as the Internet, an intranet, a local area network (LAN), a cellular network, a Wi-Fi network, and the like. The request can be sent to an appropriate content provider environment 508, which can provide one or more services, systems, or applications for processing such requests. The content provider can be any source of digital or electronic content, as may include a website provider, an online retailer, a video or audio content distributor, an e-book publisher, and the like.

In this example, the request is received by a network interface layer 510 of the content provider environment 508. The network interface layer 510 can include any appropriate components known or used to receive requests from across a network, such as may include one or more application programming interfaces (APIs) or other such interfaces for receiving such requests. The network interface layer 510 might be owned and operated by the provider, or leveraged by the provider as part of a shared resource or "cloud" offering. The network interface layer 510 can receive and analyze the request from the client device 502 and cause at least a portion of the information in the request to be directed to an appropriate system or service, such as a content server 512 (e.g., a Web server or application server), among other such options. In the case of webpages, for example, at least one server 512 might be used to generate code and send content for rendering the requested Web page. In cases where processing is to be performed (such as to identify complementary items), information might also be directed to at least one other server for processing. The servers or other components of the environment might access one or more data stores, such as a user data store 516 that contains information about the various users, and one or more content repositories 514 storing content able to be served to those users.

As mentioned, in at least some embodiments the content to be provided can include data 520 for training classifiers on matching scores of sets of items and generating recommendations for items, or other such elements that are selected based on information for the user associated with the request, for example by providing information to a recommendation engine 518 or other such component or service for identifying complementary, recommended items and generating the rankings of recommended items as discussed herein. In some embodiments, this can utilize content generated within the content provider environment 508 or received from one or more third party providers, among other such options. For example, inputs used to train a classifier algorithm can include a collection of content obtained within the environment (such as data 520) or received from the third party providers. A content server 512 or other such component or service can determine products that correspond to generated recommendations.

Various embodiments can include identifying and suggesting items that complement an item of interest using machine learning-based approaches, such as a classifier algorithm trained on matching scores of sets of items, and providing a simulated representation of how the item of interest and the identified complementary items would look together. For example, various embodiments can include receiving, from a computing device, a search query including a description of an item of interest, such as an article of clothing. The description can include a type, a size, or a color, for example. For example, a user can submit a search query for "shirt" or "long-sleeved shirt" to an electronic marketplace. Further, embodiments can include causing the search query to be executed against a data source associated with the electronic marketplace, such as the electronic marketplace's catalog of items available for purchase. Embodiments also can include receiving, in response to the search query, a set of search results associated with the article of clothing, such as apparel items available for purchase. For example, the set of search results can include various shirts and can be shown to the user with various information about the search results, including purchasing information, descriptions, and images. The user then can select one of the search results, such as a shirt that the user wishes to purchase. The selected item from the search results can be associated with a category, such as tops for the example of a selected shirt. Embodiments then can include generating a 3D or pseudo-3D (such as 2.5D) representation to illustrate how the item of interest and identified items would look together, such as a 3D or pseudo-3D representation of a human body based on the user's body measurements and/or images of the user's face, for example. In some circumstances, the representation of the body can be one of many existing representations that has dimensions that are closest or otherwise most similar to the user's body measurements. Generating the representation to be used can include modifying one or more dimensions of the representation based on a comparison between the user's body measurements and the dimensions of the representation. Generating the representation also can include superimposing a 3D or pseudo-3D (such as 2.5D) representation of the user's face on the representation of the body. The representation of the user's face can be based on at least one facial feature determined from the images of the user's face.

Various embodiments also can include causing an apparel item selected from the search results to be displayed on the representation of the body on a display of the computing device. Further, the user can select a second item category (that is different than the item category of the selected search result) for which the user would like a recommendation regarding a complementary item. Using the trained classifier algorithm, matching scores can be determined between the selected search result item and each item associated with the second item category. The matching score can indicate a probability that the selected search result item and each of the items from the second item category "match," e.g., for apparel items, form a matched outfit. The items from the second item category then can be ranked based at least in part on the matching scores. The user then can select a second item from the items from the second item category based at least in part on the rankings. Embodiments then can include causing the first item and the second item to be displayed on the representation of the body on the display of the computing device.

In some instances, the user can select a third item category that differs from the first item category and from the second item category. Embodiments then can include determining, using the trained classifier algorithm, a second matching score between the first item, the second item, and each of a third set of items associated with the third item category. The second matching score can indicate a probability that the first item, the second item, and each of the third set of items match, e.g., for apparel items, form a matched outfit. A second ranking of the third set of items can be determined based at least in part on the second matching score, and the user can select a third item from the third set of items based at least in part on the second ranking. Further, the first item, the second item, and the third item can be displayed on the representation of the body on the display of the computing device. Embodiments also can include obtaining, by a computing device, the set of body measurements and the set of images. A set of body measurements can include shirt size, height, waist circumference, or inseam. Further, the set of images can be digital photographs of the user's face. The second item can have a highest matching score and be ranked highest among the first set of items.

Various embodiments thus can address Internet-centric challenges associated with visualizing how various pieces of clothing and outfits might look on a user who is unable to try on the clothing because the clothing is available through an electronic marketplace or other electronic store, rather than a brick-and-mortar store. In contrast to clothing in a brick-and-mortar store, users may not be able to try on clothing available through electronic marketplaces prior to purchase. Embodiments advantageously provide solutions to these challenges, among others.

Figure 6:
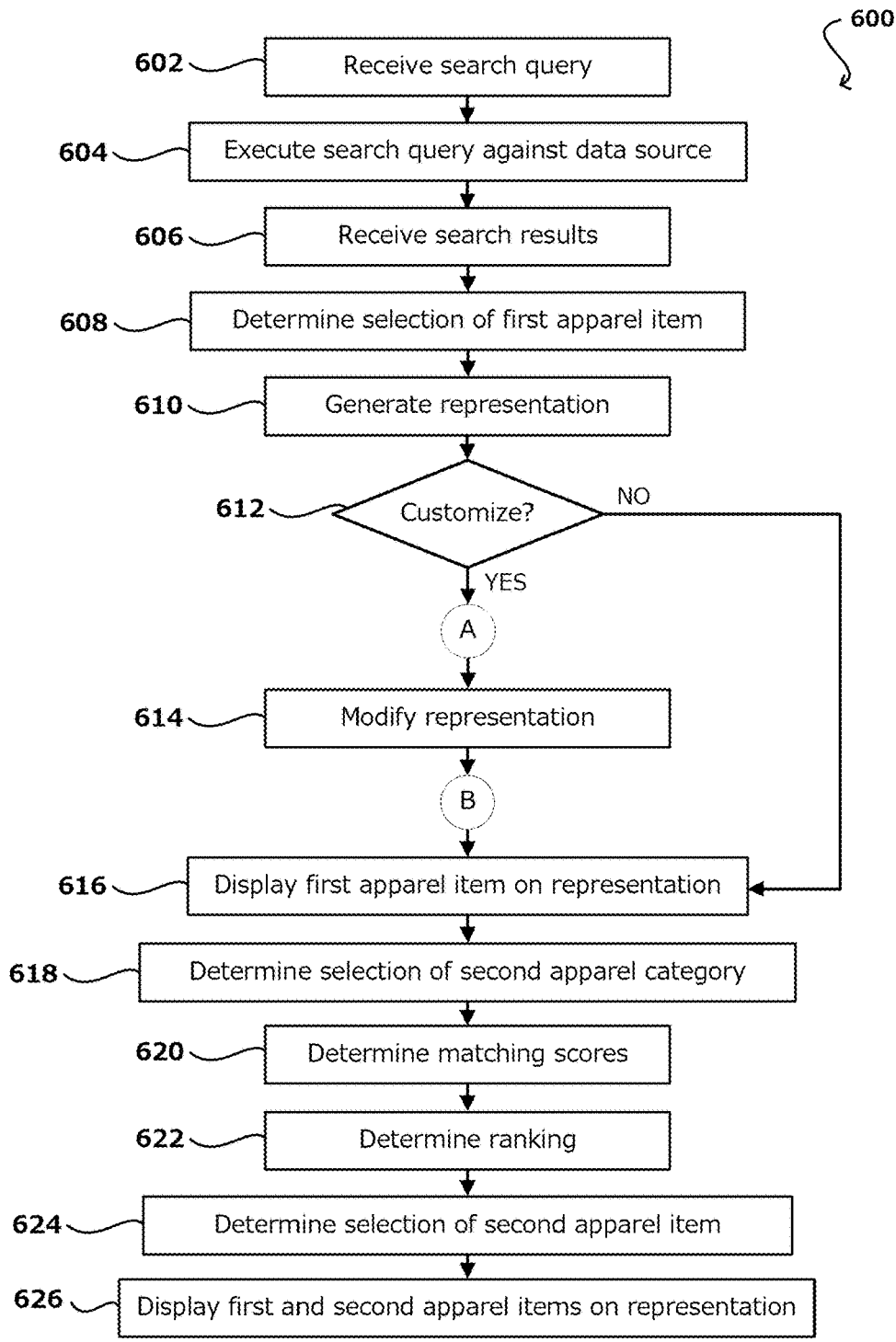
FIG. 6 illustrates an example process for identifying and displaying complementary apparel items that can be utilized in accordance with various embodiments.

As described, embodiments can include identifying and suggesting items that complement an item a user is interested in purchasing using machine learning-based approaches, such as a classifier algorithm trained on matching scores of sets of items. Further, embodiments can include providing a simulated representation of how the item of interest and the identified complementary items would look together. An example process 600 for identifying and suggesting complementary items is illustrated in FIG. 6. It should be understood that there can be additional, fewer, or alternative steps performed in similar or alternative orders, or in parallel, within the scope of the various embodiments unless otherwise stated. First, a search query can be received at step 602. The search query can include search terms or an image, among other query items. In this example, the search query is for an article of clothing and includes one or more search terms describing the article of clothing. At step 604, the search query can be executed against a data source, such as a data source associated with an electronic marketplace. After receiving the search results generated by executing the search query against the data source at step 606, in this example, a user can select a first apparel item at step 608. A representation of a human body then can be generated at step 610 to model the first apparel item, and the user can decide whether to customize the representation at step 612. If the user decides to customize the representation at step 612, a modification process 614 can begin. If the user decides not to customize the representation at step 612, a default representation of a human body can be used, and the first apparel item can be displayed on the representation at step 616. The user then can select a second apparel category at step 618. The user also can select any desired attributes for the second apparel category. Matching scores for apparel items associated with the second apparel category can be determined at step 620, and the apparel items then can be ranked based on their matching scores at step 622. The user then can select a second apparel item at step 624. Alternatively, the highest ranked apparel item associated with the second apparel category can be automatically selected at step 624. Finally, the first apparel item and the second apparel item can be displayed on the representation at step 626.

Figure 7A:
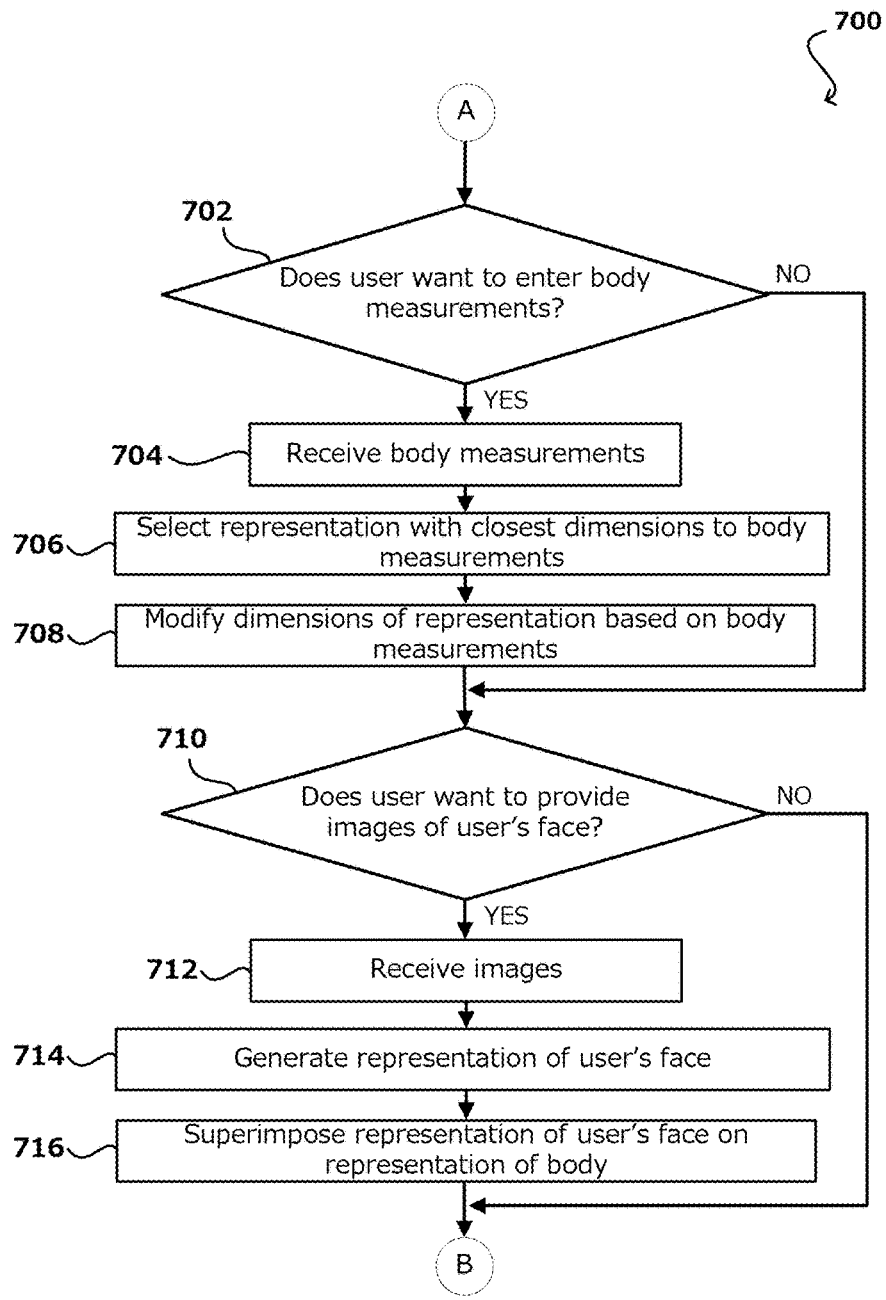
FIGS. 7A-C illustrate example processes for modifying a representation to display complementary apparel items that can be utilized in accordance with various embodiments.

As described, identifying and suggesting complementary items can include modifying a representation of a body to display apparel items. An example of a modification process 614 can include a modification process 700 as illustrated in FIG. 7A. In accordance with various embodiments, whether the user wants to enter the user's body measurements can be determined at step 702. The user can affirmatively indicate whether the user wants to enter body measurements, or the user's desire to enter body measurements can be determined by referring to the user's past actions, account preferences, or other indications of the user's behavior. If the user decides not to enter the user's body measurements at step 702, the modification process continues at step 710. If the user decides to enter the user's body measurements at step 702, the measurements can be received at step 704. Then, a representation that has dimensions most similar to the user's body measurements can be selected at step 706. The dimensions of the selected representation can be modified based on the user's body measurements so as to approximate the user's body shape and size at step 708. Then, whether the user wants to provide images of the user's face can be determined at step 710. Providing images can include taking photos or providing existing photos. Similarly to determining whether the user wants to enter body measurements at step 702, the user can affirmatively indicate whether the user wants to provide images, or the user's desire to provide images can be determined by referring to the user's past actions, account preferences, or other indications of the user's behavior. If the user decides not to provide images at step 710, process 600 can continue. If the user decides to provide images at step 710, the images can be received at step 712. The images can include, for example, panoramic photos of the user's face. The images then can be used to generate a representation of the user's face at step 714, such as a 3D or pseudo-3D (e.g., 2.5D) representation of the user's face, using a computer vision algorithm. The representation of the user's face then can be superimposed on the representation of the body at step 716, and process 600 can continue. The modification process 614 alternatively and/or additionally can occur prior to receiving a search query at step 602. That is, the model can be modified to better represent the user before the user has identified an apparel item of interest or even before the user has begun searching for clothing.

Figure 7B:
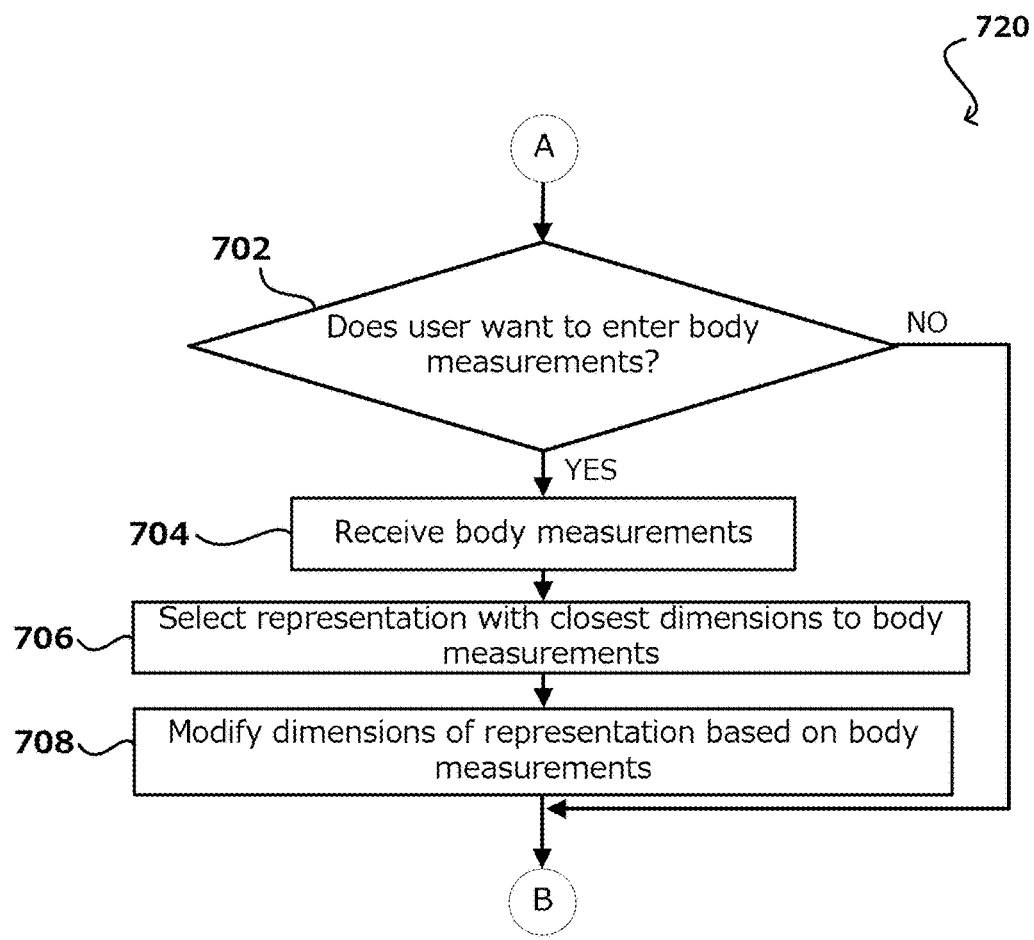
Figure 7C:
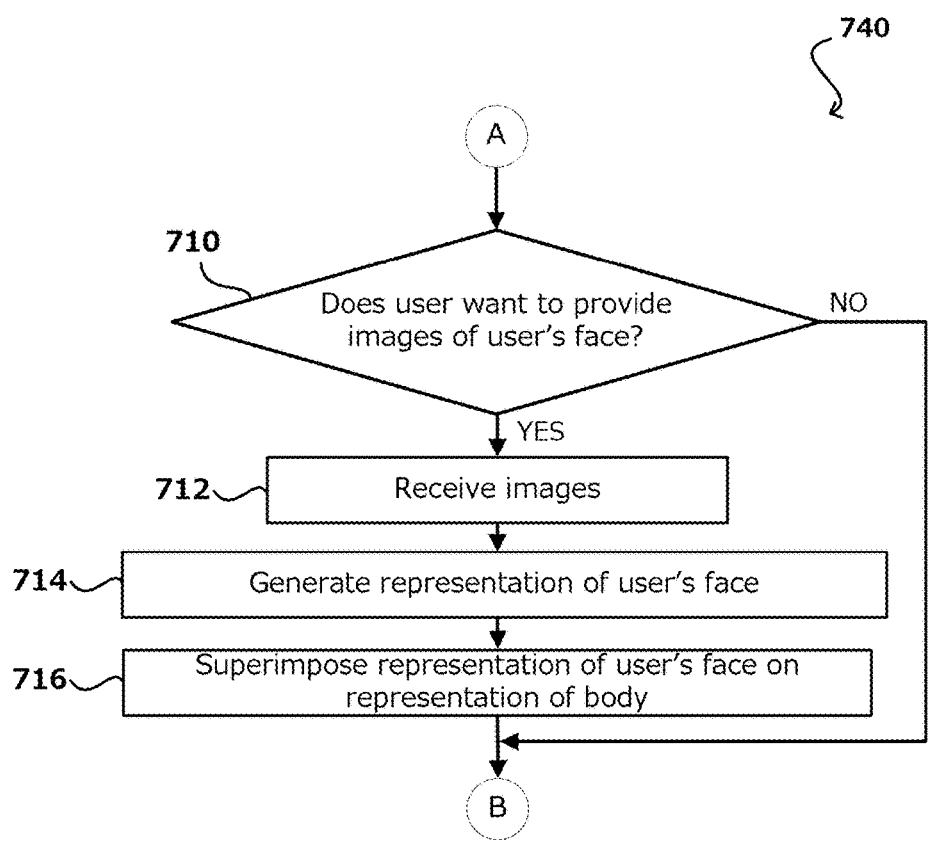

Various embodiments may use other examples of a modification process 614 in place of one or more steps, in addition to one or more steps, or combined with one or more steps in one of several orders. For example, one alternative approach to modification process 700 may include modification process 720, as illustrated in FIG. 7B, in which the user has the option to customize the model based on the user's body measurements but does not have the option to customize the model based on the user's face. Another alternative approach to modification process 700 may include modification process 740 as illustrated in FIG. 7C, in which the user has the option to customize the model based on the user's face but does not have the option to customize the model based on the user's body measurements. That is, changing the user's face image can be independent of the action of entering body measurements. Additionally, the user can modify the model more than one time using different, additional, or new representations of the user's face to generate an updated representation of the user's face.

Although modification process 614 is illustrated in FIG. 6 as part of process 600, the steps of modification processes 700, 720, or 740 or other approaches to a modification process also can be performed independently of recommending clothing using a trained classifier algorithm. That is, modification processes 700, 720, or 740 can be performed independently of process 600. For example, a model can be modified to more closely resemble a user. Then, the modified, customized model can be used to illustrate how various articles of clothing and combinations of articles of clothing would look on the user. For example, various embodiments can include selecting a representation of a human body from a set of representations of a human body having dimensions closest to a set of body measurements (e.g., shirt size, height, waist circumference, or inseam). Each of these sets of representations can be either a 3D representation or a pseudo-3D (e.g., 2.5D) representation. Embodiments then can include modifying one or more dimensions of the representation based on the set of body measurements. Additionally, a representation of a human face can be superimposed on the representation of the body. The representation of the face can be based on a set of images of the human face, for example, such as digital photographs of the human face. The set of body measurements and the set of images can be obtained using a computing device. For example, a user can input the user's measurements and take panoramic photographs of the user's face using a portable computing device. Apparel items of interest then can be displayed on the representation of the body on which the representation of the face is superimposed. The apparel items of interest that are displayed can be items that a user located while searching an electronic marketplace. For example, a user may have located a shirt and a pair of pants that the user is interested in purchasing. The shirt and the pants can be displayed together on the modified, customized representation to give the user an idea of how they would look on the user. In various embodiments, the options to customize the model based on the user's body measurements and to customize the model based on the user's face can be independent, and the user can be presented with either option or both options. As noted above, the user can modify the model more than one time. For example, the user can modify the model using different, additional, or new representations of the user's face to generate an updated representation of the user's face. The user also can modify the model using updated body measurements.

Figure 8:
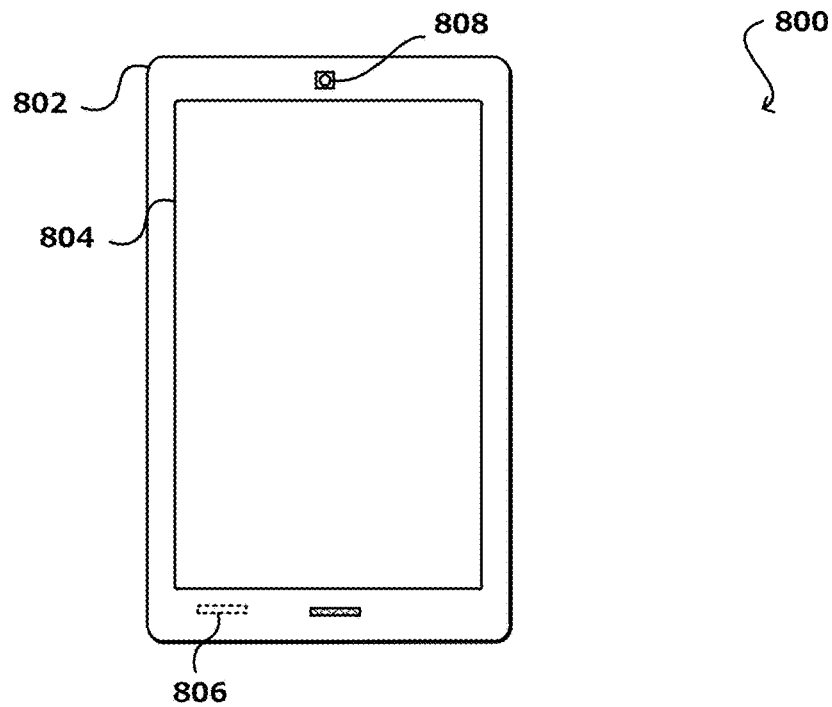
FIG. 8 illustrates an example device that can be used to implement aspects of the various embodiments.

Various embodiments also can include identifying and suggesting items that complement an item of interest using machine learning-based approaches, such as a classifier algorithm trained on matching scores of sets of items, and providing a simulated representation of how the item of interest and the identified complementary items would look together. FIG. 8 illustrates an example electronic user device 800 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 802 has a display screen 804 on the front side, which under normal operation will display information to a user facing the display screen 804 (e.g., on the same side of the computing device as the display screen 804). It should be understood that computing devices such as servers, however, may not have dedicated display elements. The example computing device 800 also includes at least one networking component 806, such as a network interface card, wireless networking component, and the like, enabling the computing device to communicate information over at least one network. Further, the example computing device 800 also includes at least one camera 808 (or other image capture sensor or element) operable to perform functions such as image and/or video capture. Each camera 808 may be, for example, a charge-coupled device (CCD), a motion detection sensor, or an infrared sensor, or can utilize another appropriate image capturing technology.

Figure 9:
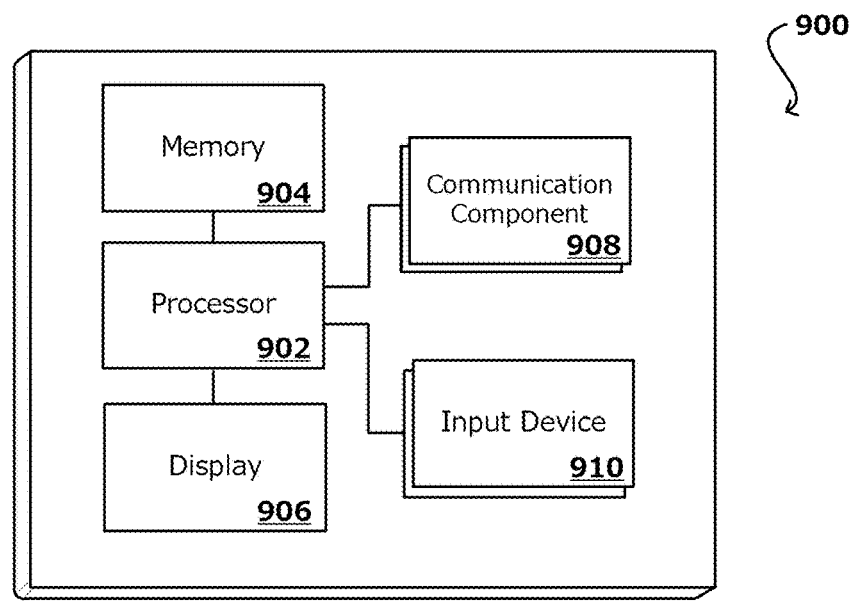
FIG. 9 illustrates example components of a client device such as that illustrated in FIG. 8.

FIG. 9 illustrates a logical arrangement of a set of general components of an example computing device 900 such as the device 800 described with respect to FIG. 8. In this example, the device 900 includes a processor 902 for executing instructions that can be stored in a memory device or element 904. As would be apparent to one of ordinary skill in the art, the device 900 can include many types of memory, data storage, or non-transitory computer-readable storage media, such as a first data storage for program instructions for execution by the processor 902, a separate storage for images or data, a removable memory for sharing information with other devices, etc. The device 900 typically will include some type of display element 906, such as a touch screen or liquid crystal display (LCD), although devices such as portable media players might convey information via other means, such as through audio speakers. In some embodiments, the computing device 900 of FIG. 9 can include one or more networking and/or communication elements 908, such as a Wi-Fi, Bluetooth, RF, wired, or wireless communication system. The device 900 in many embodiments can communicate with a network, such as the Internet, and may be able to communicate with other such devices. In some embodiments the device 900 can include at least one additional input component 910 able to receive conventional input from a user. This conventional input can include, for example, a push button, touch pad, touch screen, wheel, joystick, keyboard, mouse, keypad, or any other such device or element whereby a user can input a command to the device 900. In some embodiments, however, such a device 900 might not include any buttons at all, and might be controlled only through a combination of visual and audio commands, such that a user can control the device 900 without having to be in contact with the device 900.

Figure 10:
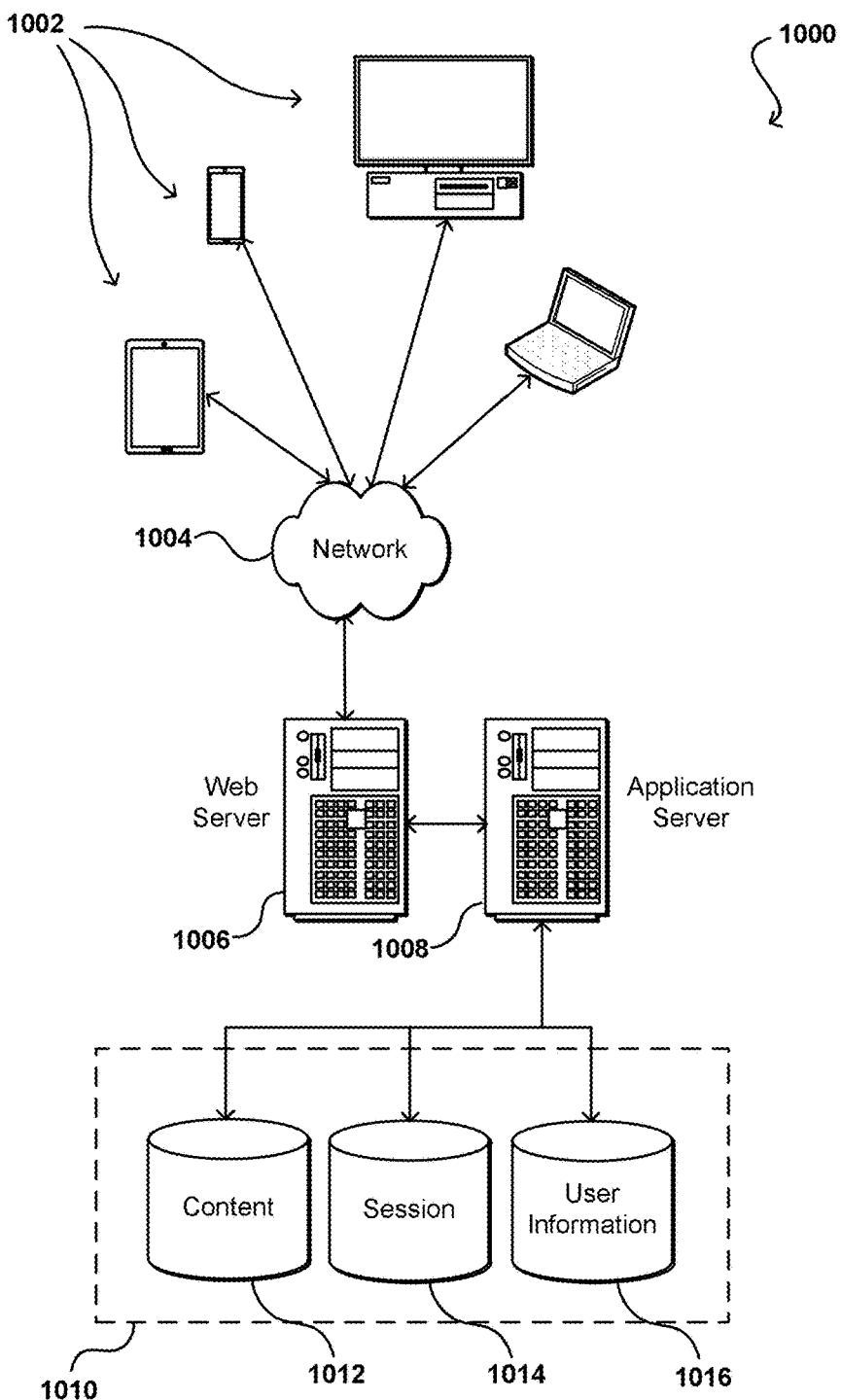
FIG. 10 illustrates an environment in which various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages, or information over an appropriate network 1004 and convey information back to a user of the device. Examples of such client devices 1002 include portable computing devices, personal computers, cell phones, handheld messaging devices, laptop computers, set-top boxes, personal data assistants, electronic book readers, and the like. The network 1004 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network 1004 can be enabled via wired or wireless connections and combinations thereof. In this example, the network 1004 includes the Internet, as the environment includes a Web server 1006 for receiving requests and serving content in response thereto, although for other networks an alternative device serving a similar purpose could be used, as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server 1008 can include any appropriate hardware and software for integrating with the data store 1010 as needed to execute aspects of one or more applications for the client device 1002 and handling a majority of the data access and business logic for an application. The application server 1008 provides access control services in cooperation with the data store 1010 and is able to generate content such as text, graphics, audio and/or video to be transferred to the user, which may be served to the user by the Web server in the form of HTML, XML, or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases, or other data storage mechanisms and media for storing data relating to a particular aspect. For example, the data store 1010 illustrated includes mechanisms for storing production data 1012 and user information 1016, which can be used to serve content for the production side. The data store 1010 also is shown to include a mechanism for storing log or session data 1014. It should be understood that there can be many other aspects that may need to be stored in the data store 1010, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. In one example, a user might submit a search request for a certain type of element. In this case, the data store 1010 might access the user information to verify the identity of the user and can access the catalog detail information to obtain information about elements of that type. The information can then be returned to the user, such as in a results listing on a Web page that the user is able to view via a browser on the user device 1002. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including non-transitory computer-readable storage media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
training a classifier algorithm on matching scores of sets of apparel items, each of the apparel items associated with an apparel category, each set of apparel items including apparel items associated with two or more apparel categories;
receiving, from a computing device, a search query including a description of an article of clothing, wherein the description includes at least one of a type, a size, or a color;
causing the search query to be executed against a data source, the data source associated with an electronic marketplace;
receiving, in response to the search query, a set of search results associated with the article of clothing, the set of search results including a first plurality of apparel items;
determining a selection of a first apparel item from the set of search results, the first apparel item associated with a first apparel category;
generating a first two-and-a-half-dimensional (2.5D) representation of a human body based on at least one of a user's body measurements or images of the user's face;
causing, on a display of the computing device, the first apparel item to be displayed on the first representation;
determining a selection of a second apparel category that differs from the first apparel category;
determining, using the trained classifier algorithm, a first matching score between the first apparel item and each of a second plurality of apparel items associated with the second apparel category, the first matching score indicating a probability that the first apparel item and each of the second plurality of apparel items form a matched outfit of apparel items associated with the two or more apparel categories;
determining a first ranking of the second plurality of apparel items based at least in part on the first matching score;
determining a selection of a second apparel item from the second plurality of apparel items based at least in part on the first ranking; and
causing, on the display of the computing device, the first apparel item and the second apparel item to be displayed on the first representation.

2. The computer-implemented method of claim 1, further comprising:
determining a selection of a third apparel category that differs from the first apparel category and from the second apparel category;
determining, using the trained classifier algorithm, a second matching score between the first apparel item, the second apparel item, and each of a third plurality of apparel items associated with the third apparel category, the second matching score indicating a probability that the first apparel item, the second apparel item, and each of the third plurality of apparel items form a matched outfit;
determining a second ranking of the third plurality of apparel items based at least in part on the second matching score;

determining a selection of a third apparel item from the third plurality of apparel items based at least in part on the second ranking; and causing, on the display of the computing device, the first apparel item, the second apparel item, and the third apparel item to be displayed on the first representation.

3. The computer-implemented method of claim 1, wherein the first representation is one of a plurality of representations having dimensions closest to the user's body measurements, and wherein generating the first representation includes:

modifying one or more dimensions of the first representation based on a comparison between the user's body measurements and the one or more dimensions of the first representation; and superimposing a second 2.5D representation of the user's face on the first representation, the second representation based on at least one facial feature determined from the images of the user's face.

4. A computer-implemented method, comprising:

causing a first apparel item to be displayed on a first representation of a human body, the first apparel item associated with a first apparel category;

determining a selection of a second apparel category that differs from the first apparel category;

determining, using a classifier algorithm trained on matching scores of sets of apparel items associated with different apparel categories, a matching score between the first apparel item and each of a first set of apparel items associated with the second apparel category, the matching score indicating a probability that the first apparel item and each of the first set of apparel items form a matched outfit of apparel items associated with the first apparel category and the second apparel category;

determining a first ranking of the first set of apparel items based at least in part on the first matching score;

determining a selection of a second apparel item from the first set of apparel items based at least in part on the first ranking; and causing the first apparel item and the second apparel item to be displayed on the first representation.

5. The computer-implemented method of claim 4, further comprising:

determining a selection of a third apparel category that differs from the first apparel category and the second apparel category;

determining, using the classifier algorithm, a second matching score between the first apparel item, the second apparel item, and each of a second set of apparel items associated with the third apparel category, the second matching score indicating a probability that the first apparel item, the second apparel item, and each of the second set of apparel items form a matched outfit;

determining a second ranking of the second set of apparel items based at least in part on the second matching score;

determining a selection of a third apparel item from the second set of apparel items based at least in part on the second ranking; and causing the first apparel item, the second apparel item, and the third apparel item to be displayed on the first representation.

6. The computer-implemented method of claim 4, further comprising:

selecting the first representation from a set of representations of a human body having dimensions closest to a set of body measurements, each of the set of representations being a two-and-a-half-dimensional (2.5D) representation or a three-dimensional (3D) representation;

modifying one or more dimensions of the first representation based on the set of body measurements; and superimposing a second representation of a human face on the first representation, the second representation based on a set of images of the human face.

7. The computer-implemented method of claim 6, further comprising:

obtaining, by a computing device, the set of body measurements and the set of images, wherein the set of body measurements include at least one of shirt size, height, waist circumference, or inseam, and wherein the set of images are digital photographs of the human face.

8. The computer-implemented method of claim 4, wherein the classifier algorithm has been trained on matching scores of sets of apparel items, each of the apparel items associated with an apparel category, each set of apparel items including apparel items associated with two or more apparel categories, wherein the apparel categories include at least one of tops, bottoms, dresses, shoes, hats, or accessories, wherein tops include at least one of shirts, blouses, t-shirts, or sweaters, and wherein bottoms include at least one of pants, shorts, jeans, or skirts.

9. The computer-implemented method of claim 8, wherein the classifier algorithm is further trained on attributes of apparel items in the sets of apparel items, and wherein the attributes include at least one of pattern, color, silhouette, material, or brand.

10. The computer-implemented method of claim 4, further comprising:

receiving a search query including at least one of a description of an article of clothing or an image of the article of clothing, the description including at least one of a type, a size, or a color;

causing the query to be executed against a data source;

receiving, in response to the query, a set of search results associated with the article of clothing, the set of search results including a plurality of apparel items;

determining a selection of the first apparel item from the set of search results.

11. The computer-implemented method of claim 10, wherein the data source is associated with an electronic marketplace, and wherein the set of search results are associated with apparel items available for purchase.

12. The computer-implemented method of claim 4, wherein the second apparel item has a highest matching score and is ranked highest among the first set of apparel items.

13. The computer-implemented method of claim 4, wherein the classifier algorithm is a trained deep learning model.

14. The computer-implemented method of claim 4, further comprising:

determining a subset of the first set of apparel items based on at least one attribute, wherein the second apparel item includes the at least one attribute.

15. A computer-implemented method, comprising:

selecting a first representation of a human body from a set of representations of a human body having dimensions closest to a set of body measurements, each of the set of representations being a two-and-a-half-dimensional (2.5D) representation or a three-dimensional (3D) representation;

modifying one or more dimensions of the first representation based on the set of body measurements;

superimposing a second representation of a human face on the first representation, the second representation based on a set of images of the human face; and causing at least one apparel item to be displayed on the first representation of a human body.

16. The computer-implemented method of claim 15, wherein the at least one apparel item includes a set of apparel items associated with two or more apparel categories, wherein the apparel categories include at least one of tops, bottoms, dresses, shoes, hats, or accessories, wherein tops include at least one of shirts, blouses, t-shirts, or sweaters, and wherein bottoms include at least one of pants, shorts, jeans, or skirts.

17. The computer-implemented method of claim 15, further comprising:

receiving a search query including at least one of a description of an article of clothing or an image of the article of clothing, the description including at least one of a type, a size, or a color;

causing the query to be executed against a data source;

receiving, in response to the query, a set of search results associated with the article of clothing, the set of search results including a plurality of apparel items;

determining a selection of the at least one apparel item from the set of search results.

18. The computer-implemented method of claim 17, wherein the data source is associated with an electronic marketplace, and wherein the set of search results are associated with apparel items available for purchase.

19. The computer-implemented method of claim 18, further comprising:

determining a subset of the set of search results based on at least one attribute, wherein the at least one apparel item includes the at least one attribute.

20. The computer-implemented method of claim 15, further comprising:

obtaining, by a computing device, the set of body measurements and the set of images, wherein the set of body measurements include at least one of shirt size, height, waist circumference, or inseam, and wherein the set of images are digital photographs of the human face.

* * * * *